United States Patent [19]
Alves et al.

[11] Patent Number: 5,956,844
[45] Date of Patent: Sep. 28, 1999

[54] INTERCONNECTION BETWEEN STEREO AND AMPLIFIER

[75] Inventors: Kasidy W. Alves, Oxnard; Thomas W. Carl, Thousand Oaks, both of Calif.

[73] Assignee: Scosche Industries Inc., Oxnard, Calif.

[21] Appl. No.: 08/880,713

[22] Filed: Jun. 23, 1997

[51] Int. Cl.$^6$ .................................................. H01R 43/00
[52] U.S. Cl. .............................. 29/854; 29/866; 439/394
[58] Field of Search ........................... 29/825, 854, 866; 439/394

[56] References Cited

U.S. PATENT DOCUMENTS 5,685,072  11/1997  Wright .

FOREIGN PATENT DOCUMENTS 664578  7/1995  European Pat. Off. .

*Primary Examiner*—Carl J. Arbes
*Attorney, Agent, or Firm*—William W. Haefliger

[57] ABSTRACT

The method of providing a cable connection between stereo equipment including circuitry, and a speaker amplifier, in a vehicle, the speaker amplifier located remotely from the circuitry, the amplifier and stereo equipment having electrical receptacles, that include providing a slippery, braided, plastic, external sheath on the cable, and providing plug-in electrical contacts at opposite ends of the cable; slidably advancing the cable past and in sliding contact with vehicle body structure that serves to conceal the cable; and plugging the contacts into the receptacle at the stereo equipment and amplifier.

9 Claims, 2 Drawing Sheets

INTERCONNECTION BETWEEN STEREO AND AMPLIFIER

BACKGROUND OF THE INVENTION

This invention relates generally to interconnecting stereo equipment and speaker amplifiers, in vehicles, and more particularly concerns improvements facilitating such interconnection where the amplifier or amplifiers are remotely located relative to the stereo equipment.

Loudspeakers and amplifiers that drive them are typically located at different locations in vehicles, such as in trunks, compartments near the vehicle rear, in doors, etc. It is necessary to pass connector cable from the stereo equipment near the front instrument panel to such amplifiers, for example along or through concealed pathways that can be tortuous. The cable can become stuck during its advancement through such pathways, i.e., behind door panels, under the floorboard, above the roof liner, etc.

There is need for provision of a way or method that will minimize the "stuck" or hang-up" problem of cable advancement through such pathways. There is also need for provision of an improved cable connection or connections between receptacles at stereo equipment and speaker amplifiers.

SUMMARY OF THE INVENTION

It is a major object of the invention to provide improvements in method and apparatus that will meet the above needs. Basically, the method of the invention includes the following steps:

a) providing a slippery, braided, plastic (NYLON, for example), external sheath on the cable, and providing plug-in electrical contacts at opposite ends of the cable, b) slidably advancing the cable past and in sliding contact with vehicle body ribs and panel structure that serves to conceal the cable, c) and freely plugging the contacts into receptacles at the stereo equipment and amplifier.

As will be seen, the cable braided, plastic sheet may advantageously consist of NYLON, or an equivalent slipper, i.e., low-friction material, having variable and slippery contact with vehicle passage edges, due to the interrupted slipper surfaces at the sheath.

Another object is to provide grips at the opposite ends of the braided sheath, to have cylindrical manually grippable surfaces that will easily pass through the tortuous passages between the stereo equipment and the amplifiers, such grips having gripping surfaces with diameters substantially greater than the braided, plastic sheath. Such surfaces also facilitate ease of grasping and contact plug-in, into the receptacles, at the stereo equipment and at the amplifiers.

Yet another object is to provide the grip surfaces to include multiple elastomeric rings which are coaxially spaced in relation to the braided sheath. Additional such surfaces may be provided to have outwardly presented concave form in axial radial planes. In this regard, the elastomeric surfaces are desirably provided to have greater diameters than the minimum diameters of the smooth, concave surface or surfaces, to optimize ease of contact plug-in and pullout.

A further object is to provide the elastomeric ring grip closer to the slippery, braided sheath than the concave, metallic grip, so that the slipperiness of the braided sheath will aid advancement of the enlarged grippable contact through the tortuous passageway between the stereo equipment and the amplifier, the contact provided in cylindrical form to enhance ease of such advancement.

These and other objects and advantages of the invention, as well as the details of an illustrative embodiment, will be more fully understood from the following specification and drawings, in which:

DRAWING DESCRIPTION

DETAILED DESCRIPTION

Figure 1:
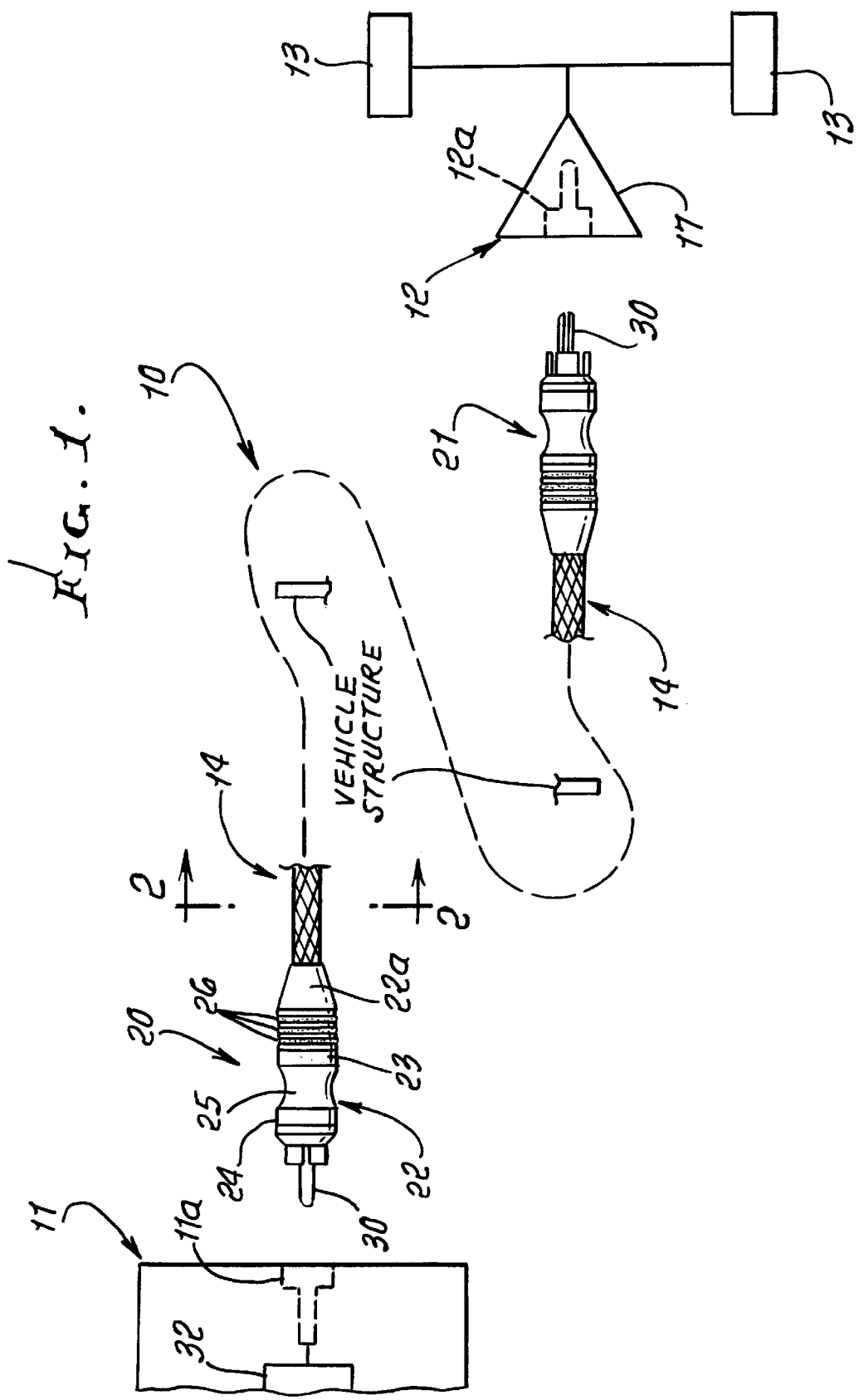
FIG. 1 is an elevation showing provision of a system incorporating the invention.
Figure 3:
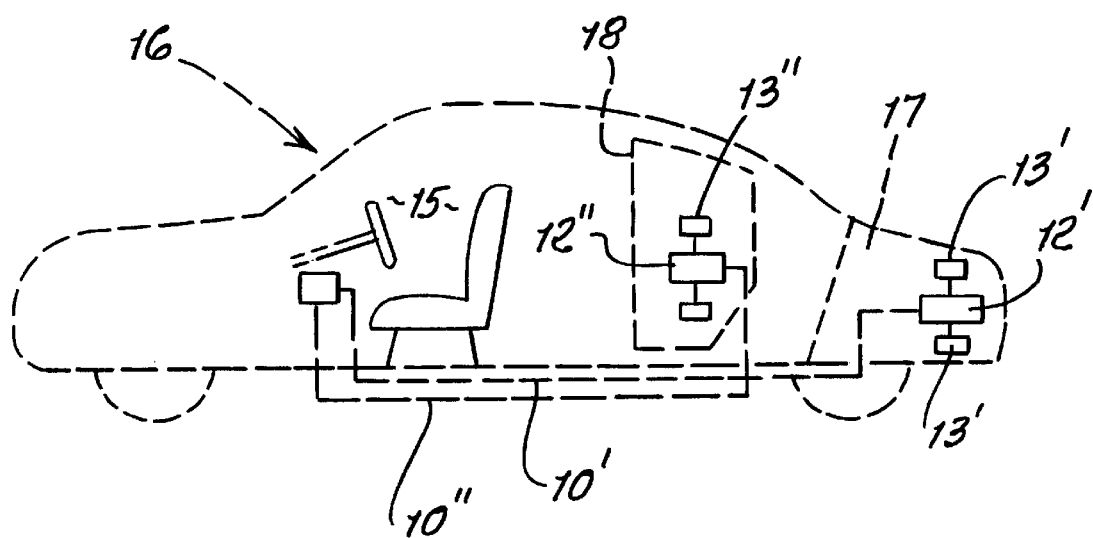
FIG. 3 is a view of a vehicle showing stereo equipment and remotely located amplifier or amplifiers and loudspeakers.

In FIG. 1, a plug-in type cable connector indicated generally at 10 is provided between a receptacle 11a at a stereo unit or equipment 11, and a receptacle 12a at a speaker amplifier unit 12. The amplifier unit or units electrically drive loudspeakers 13, the unit 12 and speakers 13 typically, but not always, located remotely from the stereo unit 11. That unit is typically controllable (ON-OFF, sound level or levels, etc.) by the driver or passenger in the front compartment 15 of a vehicle, as seen in FIG. 3. Note in FIG. 3 the locations of amplifier and loudspeaker units 12' and 12" in the trunk area 17, and in the door 18 (behind a door panel) of the vehicle. Cable connections appear at 10' and 10".

Figure 2:
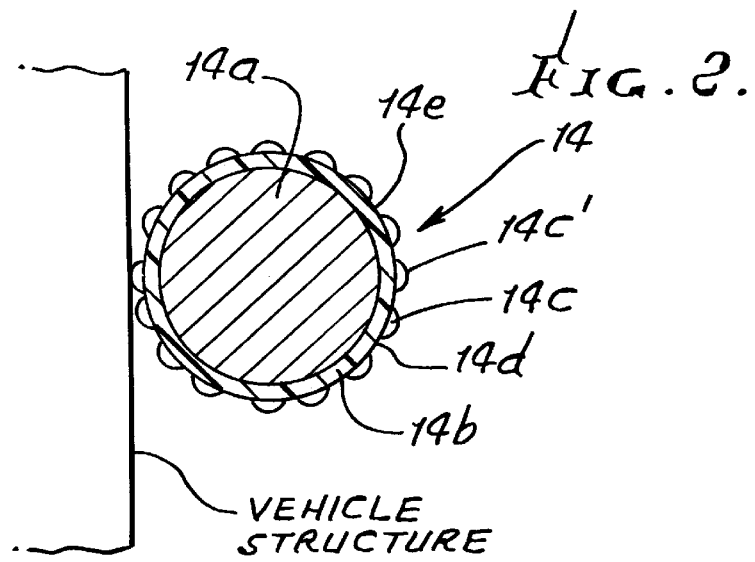
FIG. 2 is an enlarged view taken in section in lines 2—2 of FIG. 1.

In accordance with the invention, a slippery, braided, plastic, external sheath is on or integrated with a cable 14. As shown in FIG. 2, the cable typically consists of a conductive core or cores 14a around which the sheath 14b extends. The lands 14c, shown at the periphery of the sheath, are defined by the braid strands between which gaps 14d appear. The strands typically extend diagonally, as indicated in FIG. 1, and in crossover pattern. They are formed by low friction, i.e., slippery material, such as NYLON, or other insulative low-friction, plastic material.

The surfaces of the braids are outwardly convex to provide low-friction crests at 14c'. This, together with the gaps 14e between the strands, provides for very low friction contact with vehicle structural components over which the cable slides. In addition, the cable is very flexible, to enable bending around structural parts of the vehicle.

Plug-in electrical contacts 20 and 21 are provided at opposite ends of the cable 14, and are connected to such opposite ends. Preferably, the contacts are alike and are larger in diameter than the cable. Each contact body 22 has a first diametrically enlarged portion 23, a second diametrically enlarged portion 24 offset from portion 23 in a direction away from the cable, and a third and intermediate body portion 25, which is of generally reduced size. The Venturi-shaped surface of the portion 25 has outwardly presented concave form in axial radial planes, as shown, thereby providing a smooth grip for the tips of the fingers of the user to grasp the contact, for plug-in purposes.

Such concave configuration generally conforms to the convex surfaces of the user's fingers and thumb received against such surfaces. Frictional grip surfaces are also provided on the body portion 23, and preferably in the form of multiple elastomeric rings 26, which are spaced apart axially on the body, and in co-axial relation to the braided sheath. Such O-rings are typically received in annular grooves in the body portion 23, but protrude slightly from such grooves to be engaged by other portions of the user's fingers and thumb further from the finger and thumb tips. Such engagement is frictional, due to the material of the rings, to provide for positive frictional gripping during plugging and unplugging of the contact.

The substantially larger diameters of the rings, relative to the cable diameter and relative to surfaces 25, ensures that the user will not pull on the cable itself during such plugging and unplugging. Typically, the rings have outer diameters of between 7/16 inch and 9/16 inch, whereas the cable sheath has a diameter of about 1/4 inch.

The body 22 tapers at 22*a* from the portion 23 toward the cable, whereby a smooth transition is provided by such conical taper, from the metallic contact body to the NYLON braided sheath.

At the opposite end of the contact, an electrical central prong 30 protrudes from contact portion 24, and centrally toward the receptacle recess 11*a,* at a stereo unit 11; and a similar receptacle 12*a* is provided at the amplifier unit 12 to receive the central prong 30 of the contact 21 at the opposite end of the cable. Electrical contact is thereby easily made between 11 and 12 when the prongs 30 are received into the receptacles. Circuitry at the stereo unit is indicated at 32.

Cable core 14*a* is in electrical communication with prongs 30.

I claim:

1. The method of providing a cable connection between stereo equipment including circuitry, and a speaker amplifier, in a vehicle, the speaker amplifier located remotely from said circuitry, said amplifier and stereo equipment having electrical receptacles, that includes,
   a) providing a slippery, braided, plastic, external sheath on the cable, and providing plug-in electrical contacts at opposite ends of the cable,
   b) slidably advancing the cable past and in sliding contact with vehicle body structure that serves to conceal the cable,
   c) plugging said contacts into said receptacles at the stereo equipment and amplifier,
   d) and providing grips on said contacts to have cylindrical gripping surfaces with diameters substantially greater than the braided, plastic sheath.

2. The method of claim 1 wherein said braided, plastic sheath consists of NYLON.

3. The method of claim 1 wherein said cylindrical gripping surface diameter is between about 7/16 and 9/16 inches.

4. The method of claim 1 wherein said surfaces are provided in the form of multiple elastomeric rings which are coaxially spaced apart in relation to the braided sheath.

5. The method of claim 1 wherein said surfaces are provided to have outwardly presented concave form in axial radial planes.

6. The method of claim 1 wherein said surfaces on each contact are provided to include
   i) first surfaces in the form of multiple elastomeric rings which are coaxially spaced in relation to the braided sheath,
   ii) second surfaces spaced from said first surfaces and which are provided to have outwardly presented concave form in axial radial planes.

7. The method of claim 6 wherein said first surfaces are provided to have greater diameters than the diameters of said second surfaces.

8. The method of claim 6 wherein said first surfaces are provided to be closer than said second surfaces to said braided, plastic sheath projecting free of the plug.

9. The method of providing a cable connection between electrical equipments spaced apart in a vehicle, the said equipments having electrical receptacles, that includes,
   a) providing a slippery, braided, plastic, external sheath on the cable, and providing plug-in electrical contacts at opposite ends of the cable,
   b) slidably advancing the cable past and in sliding contact with vehicle body structure that serves to conceal the cable,
   c) plugging said contacts into said receptacles at the stereo equipment and amplifier,
   d) and providing a grip on at least one of said contacts to have a cylindrical gripping surface with diameter substantially greater than the diameter of said braided plastic sheath near the one contact.

\* \* \* \* \*